US009366763B2

(12) United States Patent  (10) Patent No.: US 9,366,763 B2
Biacs et al.  (45) Date of Patent: Jun. 14, 2016

(54) METHOD AND APPARATUS FOR POSITION DETERMINATION WITH HYBRID SPS ORBIT DATA

(75) Inventors: Zoltan F. Biacs, San Mateo, CA (US); Leonid Sheynblat, Hillsborough, CA (US); Arnold Jason Gum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 350 days.

(21) Appl. No.: 12/365,657

(22) Filed: Feb. 4, 2009

(65) Prior Publication Data

US 2010/0194634 A1  Aug. 5, 2010

Related U.S. Application Data

(60) Provisional application No. 61/045,221, filed on Apr. 15, 2015.

(51) Int. Cl.
*G01S 19/48* (2010.01)
*G01S 19/27* (2010.01)
(Continued)

(52) U.S. Cl.
CPC .......... *G01S 19/33* (2013.01); *G01S 19/23* (2013.01); *G01S 19/258* (2013.01); *G01S 19/27* (2013.01); *G01S 19/42* (2013.01)

(58) Field of Classification Search
CPC ......... G01S 19/09; G01S 19/27; G01S 19/33; G01S 19/37; G01S 19/50; G01S 19/258
USPC .............. 342/357.06, 357.31, 357.66, 357.73
See application file for complete search history.

(56) References Cited

U.S. PATENT DOCUMENTS 5,202,829 A  4/1993  Geier
5,323,322 A  6/1994  Mueller et al.
(Continued)

FOREIGN PATENT DOCUMENTS

CN  1461415 A  12/2003
EP  1215508 A1  6/2002
(Continued)

OTHER PUBLICATIONS

Feng, Y. et al.: "Representing GPS Orbits and Corrections Efficiently for Precise Wide Area Positioning," ION GNSS. International Technical Meeting of the Satellite Division of the Institute of Navigation, Washington D.C., US, Sep. 21, 2004, pp. 2316-2323, XP002413338.
(Continued)

*Primary Examiner* — Frank J McGue
(74) *Attorney, Agent, or Firm* — Thien T. Nguyen

(57) ABSTRACT

A method and system for a mobile station to determine its position (or velocity) and time using a hybrid combination of satellite orbit data. In one aspect, the mobile station combines predicted orbit data from one satellite and real-time orbit data from another satellite in the determination of a fix. The combination can be made to the satellites in the same or different satellite systems. The mobile station can use the real-time orbit data of a satellite at one time period and the predicted orbit data of the same satellite at another time period. In another aspect, the mobile station can use the real-time orbit data to correct the clock bias in the predicted orbit data. The correction to the clock bias can be made to the same satellite that provides the real-time orbit data, or to a different satellite in the same or in another satellite system.

15 Claims, 8 Drawing Sheets

(51) Int. Cl.
*G01S 19/33* (2010.01)
*G01S 19/23* (2010.01)
*G01S 19/25* (2010.01)
*G01S 19/42* (2010.01)

(56) References Cited

U.S. PATENT DOCUMENTS

| | | | |
|---|---|---|---|
| 5,731,786 A * | 3/1998 | Abraham et al. | 342/357.25 |
| 5,731,787 A | 3/1998 | Sheynblat | |
| 5,764,184 A * | 6/1998 | Hatch et al. | 342/357.44 |
| 5,828,336 A | 10/1998 | Yunck et al. | |
| 5,862,495 A | 1/1999 | Small et al. | |
| 5,909,381 A | 6/1999 | Shome et al. | |
| 5,917,444 A | 6/1999 | Loomis et al. | |
| 5,963,167 A | 10/1999 | Lichten et al. | |
| 6,058,338 A | 5/2000 | Agashe et al. | |
| 6,085,128 A | 7/2000 | Middour et al. | |
| 6,134,483 A | 10/2000 | Vayanos et al. | |
| 6,211,819 B1 | 4/2001 | King et al. | |
| 6,219,376 B1 * | 4/2001 | Zhodzishsky et al. | 375/148 |
| 6,323,803 B1 | 11/2001 | Jolley et al. | |
| 6,411,892 B1 | 6/2002 | van Diggelen | |
| 6,424,890 B1 | 7/2002 | Syrjarinne et al. | |
| 6,434,509 B1 * | 8/2002 | Tsuchiya et al. | 702/158 |
| 6,438,382 B1 | 8/2002 | Boesch et al. | |
| 6,453,237 B1 | 9/2002 | Fuchs et al. | |
| 6,487,499 B1 | 11/2002 | Fuchs et al. | |
| 6,542,820 B2 | 4/2003 | LaMance et al. | |
| 6,560,534 B2 | 5/2003 | Abraham et al. | |
| 6,583,916 B2 | 6/2003 | Carlson et al. | |
| 6,587,789 B2 | 7/2003 | van Diggelen | |
| 6,606,346 B2 | 8/2003 | Abraham et al. | |
| 6,671,620 B1 | 12/2003 | Garin et al. | |
| 6,683,564 B1 | 1/2004 | McBurney | |
| 6,704,348 B2 | 3/2004 | Abraham et al. | |
| 6,757,610 B1 | 6/2004 | Mann et al. | |
| 6,798,377 B1 | 9/2004 | Lupash et al. | |
| 6,829,535 B2 | 12/2004 | van Diggelen et al. | |
| 6,853,916 B2 | 2/2005 | Fuchs et al. | |
| 6,930,635 B2 | 8/2005 | Vayanos et al. | |
| 7,019,689 B1 | 3/2006 | McBurney et al. | |
| 7,053,824 B2 | 5/2006 | Abraham | |
| 7,053,826 B1 | 5/2006 | McBurney et al. | |
| 7,057,554 B2 | 6/2006 | McBurney | |
| 7,123,190 B1 | 10/2006 | McBurney et al. | |
| 7,142,157 B2 | 11/2006 | Garin et al. | |
| 7,158,080 B2 | 1/2007 | van Diggelen | |
| 7,548,200 B2 | 6/2009 | Garin | |
| 7,693,660 B2 | 4/2010 | Van Diggelen et al. | |
| 7,839,331 B2 | 11/2010 | Zhang et al. | |
| 8,358,245 B2 | 1/2013 | Van Diggelen | |
| 8,493,267 B2 | 7/2013 | Wengler et al. | |
| 2002/0102990 A1 | 8/2002 | Alberth, Jr. et al. | |
| 2003/0008666 A1 * | 1/2003 | Ohmura et al. | 455/456 |
| 2003/0163256 A1 | 8/2003 | Edwards et al. | |
| 2003/0176969 A1 | 9/2003 | Diggelen | |
| 2004/0077365 A1 | 4/2004 | Abraham et al. | |
| 2004/0160360 A1 | 8/2004 | Jung et al. | |
| 2005/0068229 A1 | 3/2005 | Moilanen et al. | |
| 2005/0080561 A1 | 4/2005 | Abraham et al. | |
| 2005/0083232 A1 | 4/2005 | Trautenberg | |
| 2006/0082497 A1 | 4/2006 | Rotman et al. | |
| 2006/0119505 A1 | 6/2006 | Abraham | |
| 2006/0224317 A1 | 10/2006 | Sarkar | |
| 2006/0290566 A1 | 12/2006 | Syrjarinne et al. | |
| 2007/0200752 A1 | 8/2007 | Van Diggelen et al. | |
| 2007/0247361 A1 | 10/2007 | Shoarinejad | |
| 2007/0273581 A1 | 11/2007 | Garrison et al. | |
| 2007/0299609 A1 * | 12/2007 | Garin et al. | 701/226 |
| 2008/0079633 A1 * | 4/2008 | Pon et al. | 342/357.12 |
| 2008/0088506 A1 * | 4/2008 | Fischer | 342/357.06 |
| 2008/0111736 A1 | 5/2008 | Han | |
| 2008/0186228 A1 | 8/2008 | Garin et al. | |
| 2009/0237302 A1 | 9/2009 | Derbez et al. | |
| 2009/0289849 A1 * | 11/2009 | Baddini Mantovani | 342/357.15 |
| 2009/0295630 A1 | 12/2009 | Wengler et al. | |
| 2009/0315772 A1 | 12/2009 | Wengler et al. | |
| 2011/0102253 A1 * | 5/2011 | Morrison | 342/357.25 |
| 2013/0201056 A1 | 8/2013 | Wengler et al. | |
| 2013/0201059 A1 | 8/2013 | Wengler et al. | |

FOREIGN PATENT DOCUMENTS

| | | |
|---|---|---|
| EP | 1429115 A1 | 6/2004 |
| EP | 1852711 | 11/2007 |
| GB | 2365722 A | 2/2002 |
| JP | H01148984 A | 6/1989 |
| JP | H05223590 A | 8/1993 |
| JP | H08265239 A | 10/1996 |
| JP | H1048305 | 2/1998 |
| JP | H10213643 A | 8/1998 |
| JP | H11118899 A | 4/1999 |
| JP | 2002044712 A | 2/2002 |
| JP | 2002243830 A | 8/2002 |
| JP | 2003262668 A | 9/2003 |
| JP | 2003527567 A | 9/2003 |
| JP | 2004529032 A | 9/2004 |
| JP | 2004340618 A | 12/2004 |
| JP | 2005241517 A | 9/2005 |
| JP | 2005530985 A | 10/2005 |
| JP | 2006084426 A | 3/2006 |
| JP | 2006090970 A | 4/2006 |
| JP | 2006525505 A | 11/2006 |
| RU | 2161317 C1 | 12/2000 |
| RU | 2197780 C2 | 1/2003 |
| RU | 2213980 C2 | 10/2003 |
| TW | 200405026 | 4/2004 |
| TW | 200516271 | 5/2005 |
| TW | 200602657 | 1/2006 |
| WO | WO9838522 A1 | 9/1998 |
| WO | WO9919743 A1 | 4/1999 |
| WO | WO-0104657 A1 | 1/2001 |
| WO | WO-0215612 B1 | 5/2002 |
| WO | WO-02099454 A2 | 12/2002 |
| WO | 2004099813 | 11/2004 |
| WO | WO-2005012940 A1 | 2/2005 |
| WO | 2006/031652 A2 | 3/2006 |
| WO | WO-2006106918 A1 | 10/2006 |
| WO | WO-2007106908 A1 | 9/2007 |

OTHER PUBLICATIONS

International Search Report, PCT/US2007/083501—International Search Authority—European Patent Office—Nov. 4, 2008.

Written Opinion, PCT/US2007/083501—International Search Authority—European Patent Office—Nov. 4, 2008.

International Search Report and Written Opinion—PCT/US2009/040722, International Search Authority—European Patent Office—Oct. 22, 2010.

Milan Horemuz, et al., "Polynomial interpolation of GPS satellite coordinate" / GPS Solutions, Springer, Berlin, DE, vol. 10, No. 1, Feb. 1, 2006, pp. 67-72, XP019357603 ISSN: 1521-1886 p. 69 right-hand-column.

Yanming Feng, et al., "Efficient interpolations to GPS orbits for precise wide area applications" GPS Solutions, Springer, Berlin, DE, vol. 9, No. 4, Nov. 1, 2005, pp. 273-282, XP019357648 ISSN: 1521-1886 the whole document.

"MATLAB Implementation," http://www.ngs.noaa.gov/gps-toolbox/Vium.htm, pp. 1-2.

Taiwan Search Report—TW098112561—TIPO—Nov. 29, 2012.

European Search Report—EP07106670—Search Authority—Munich—Feb. 26, 2013.

European Search Report—EP12007575—Search Authority—Munich—Mar. 6, 2013.

European Search Report—EP12007576—Search Authority—Munich—Mar. 6, 2013.

European Search Report—EP12007577—Search Authority—Munich—Feb. 13, 2013.

(56) References Cited

OTHER PUBLICATIONS

Sakai., T., et al., "Augmentation Signal Structure for QZSS Satellite Navigation System," Technical Report of the Institute of Electronics, Information and Communication Engineers, Space, Aeronautical and Navigational Electronics (SANE), Japan, The Institute of Electronics, Information and Communication Engineers (IEICE), Jul. 23, 2004. 104 (237): 7-12.

Sakai., T., et al., "Ephemeris Message for Quasi-Zenith Satellites," Technical Report of the Institute of Electronics, Information and Communication Engineers, Space, Aeronautical and Navigational Electronics (SANE), Japan, The Institute of Electronics, Information and Communication Engineers (IEICE). Jul. 21, 2006. 106 (192): 37-42.

* cited by examiner

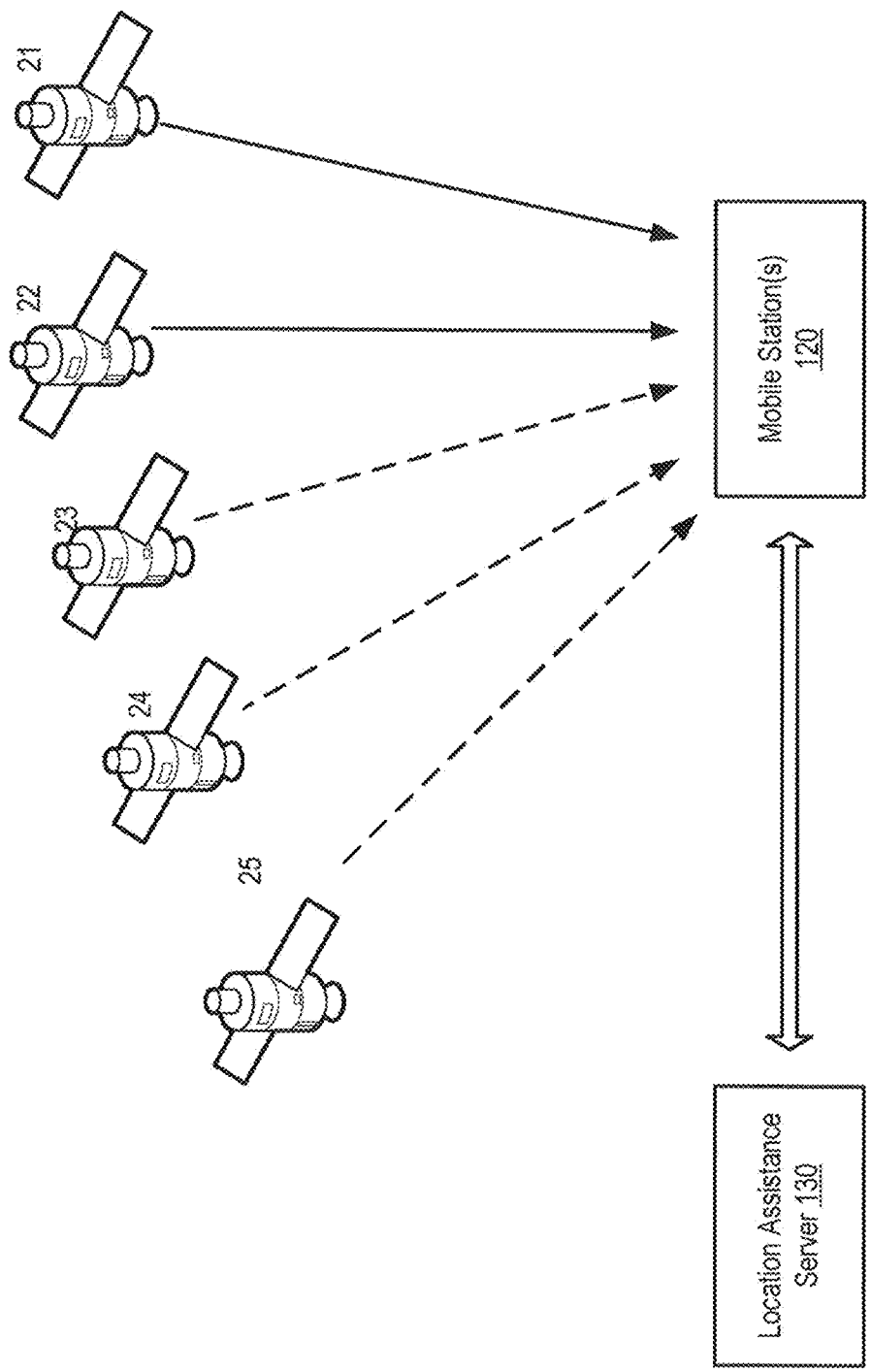

Orbit Data of a Single Satellite in a Time Sequence

METHOD AND APPARATUS FOR POSITION DETERMINATION WITH HYBRID SPS ORBIT DATA

CLAIM OF PRIORITY UNDER 35 U.S.C. §119(e)

The present Application claims the benefit of and priority to U.S. Provisional Application Ser. No. 61/045,221, entitled "METHOD AND APPARATUS FOR POSITION DETERMINATION WITH HYBRID SPS ORBIT DATA," and filed Apr. 15, 2008, which is assigned to the assignee hereof.

BACKGROUND

1. Field

The present invention relates generally to a satellite positioning system (SPS), and more particularly, to assisting a mobile station to determine its position and time using SPS orbit information.

2. Background Information

A satellite positioning system (SPS) receiver normally determines its position by computing times of arrival of signals from multiple satellites. These satellites transmit, as part of their messages, both satellite positioning data and satellite clock timing data. The satellite positions, velocity and clock timing typically are represented by almanac and ephemeris data. The ephemeris data refers to the content of subframes 1, 2 and 3 of the messages transmitted from a satellite. The ephemeris provides an extremely accurate estimate (~1 meter error) orbit (satellite positions, clock and clock bias). However, the typical process of searching for and acquiring satellite signals, reading the ephemeris data transmitted by the satellites, and computing the location of the receiver from this data is time consuming and requires moderately strong signal levels.

For example, Global Positioning System (GPS) devices determine position based on the measurement of the times of arrival at a GPS receiver of the GPS signals broadcast from orbiting satellites. As stated, one disadvantage of such a system is the relatively long time needed to perform standalone signal acquisition. Satellite signals cannot be tracked until they have first been located by searching in a two-dimensional search "space", whose dimensions are code-phase delay and observed Doppler frequency shift. The process of an SPS receiver searching for, acquiring, and demodulating satellite signals is sometimes referred to as a "standalone" mode of operation, which can be contrasted with an "assisted" mode of operation.

In order to reduce the delay associated with a standalone mode of operation, information may be provided to aid an SPS or GPS receiver in acquiring a particular signal. Such assistance information permits a receiver to narrow the search space that must be searched in order to locate a signal, by providing bounds on the code and frequency uncertainty. A system that employs a GPS receiver augmented with GPS assistance data is commonly referred to as an "assisted global positioning system" (AGPS).

One example of an AGPS system includes a wireless mobile station (MS) (such as a cellular telephone) having, or in communication with, a GPS receiver, the MS in communication with one or more base stations (BSs), also referred to as base transceiver substations (BTSs) or node Bs, of a wireless communication network, which in turn communicate with one or more location assistance servers, sometimes referred to as Position Determination Entities (PDEs) or Serving Mobile Location Centers (SMLCs), depending upon the communication air interface protocol. Another example of an AGPS system includes a MS or laptop, having, or in communication with, a GPS receiver, the MS or laptop capable of communication with a communication network, such as but not limited to, the Internet, through which the device communicates with a location assistance server.

The location assistance server derives GPS assistance information from one or more GPS reference receivers (wide area of global reference network). The location assistance server also has access to a means of determining the approximate mobile station position. The location assistance server maintains a GPS database that may include reference time, satellite orbit almanac and ephemeris information, ionosphere information, and satellite working condition ("health") information. The location assistance server also computes the assistance information customized for the approximate mobile station position.

The position of a MS in an AGPS system can be determined at the MS (sometimes referred to as MS-based positioning mode) with assistance from a location assistance server. During MS-based positioning mode, when a GPS engine requires updated aiding data such as ephemeris data, almanac data regarding the location of satellites or base stations, timing information for the base stations and/or satellites, or seed position (such as, but not limited to that determined by advanced forward link trilateration (AFLT)), and so on, the next position fix will result in the mobile station contacting the communication network for data, thereby taxing the network and using power resources of the MS. The position of a MS in an AGPS system can alternatively be determined at the location assistance server and transmitted back to the MS using information acquired by the MS (sometimes referred to as MS-assisted positioning mode). SPS Satellite orbits can be modeled as modified elliptical orbits with correction terms to account for various perturbations. The relative short-term ephemeris data provides a very accurate representation of the orbit of the satellite. For example, bit 17 in word 10 of GPS subframe 2 is a "fit interval" flag which indicates the curve fit interval used by the GPS control segment in determining the ephemeris parameters with "0" indicating a 4-hour fit and "1" indicating a "greater than 4 hours" fit. Furthermore, the extended navigation mode of the Block II/IIA GPS satellites guarantees the transmission of correct ephemeris parameters for 14 days to support short-term extended operation. During normal operation, the control segment provides daily uploads of the navigation (orbital) data to each satellite to support a positioning accuracy of 16 meters spherical error probable (SEP).

The position of a MS in an AGPS system can also be determined at the MS using ephemeris data directly received from satellites. The ephemeris data, during its period of validity (e.g., a 4-hour epoch), is more accurate than almanac data and predicted orbit data. Predicted orbit data is an estimate of satellite position, velocity and timing based on an orbit solution predicted by a system other than the real time satellite positioning system (e.g. GPS Control Segment). However, the broadcast ephemeris data may not be available to a mobile station all the time due to lack of line of sight, shadowing, poor signal conditions or other reception problems that prevents the MS from demodulating satellite broadcasts and, when available, will still require time to demodulate.

A system and method is needed to enable an SPS receiver to utilize available orbit data to produce accurate positions and timing even when current real time orbit and clock bias information is not available (either from broadcast data or from location assistance server data).

SUMMARY OF THE DESCRIPTION

A method and system for a mobile station to determine its position (or velocity) and time using a hybrid combination of satellite orbit data is described. In one aspect, the mobile station combines predicted orbit data from one satellite and real-time orbit data from another satellite in the determination of a fix. The mobile station can dynamically change the combination as the availability of the real-time orbit data changes. The combination can be made to the satellites in the same satellite system or different satellite systems. The mobile station can use the real-time orbit data of a satellite at one time period and the predicted orbit data of the same satellite at another time period. In another aspect, the mobile station can use the real-time orbit data to correct the clock bias in the predicted orbit data. The correction to the clock bias can be made to the same satellite that provides the real-time orbit data, or a different satellite. The different satellite can be in the same satellite system or in another satellite system. In another aspect, additional uncertainty presented by the predicted orbit data and the age of the orbit data can be accounted for in weighted least squares or other calculation.

The method and system described herein provides flexibility and improves accuracy in a mobile fix. Satellite orbit data from different sources can be dynamically combined by the mobile station. Real-time orbit data can be used to improve the accuracy of the clock bias of the predicted orbit data and to update the predicted data with a fit to actual orbit data.

Other features of the present invention will be apparent from the accompanying drawings and from the detailed description which follows.

BRIEF DESCRIPTION OF THE DRAWINGS

The present invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 2A is a diagram showing the mobile station (MS) of FIG. 1 receiving orbit data from a plurality of satellites.

DETAILED DESCRIPTION

Figure 1:
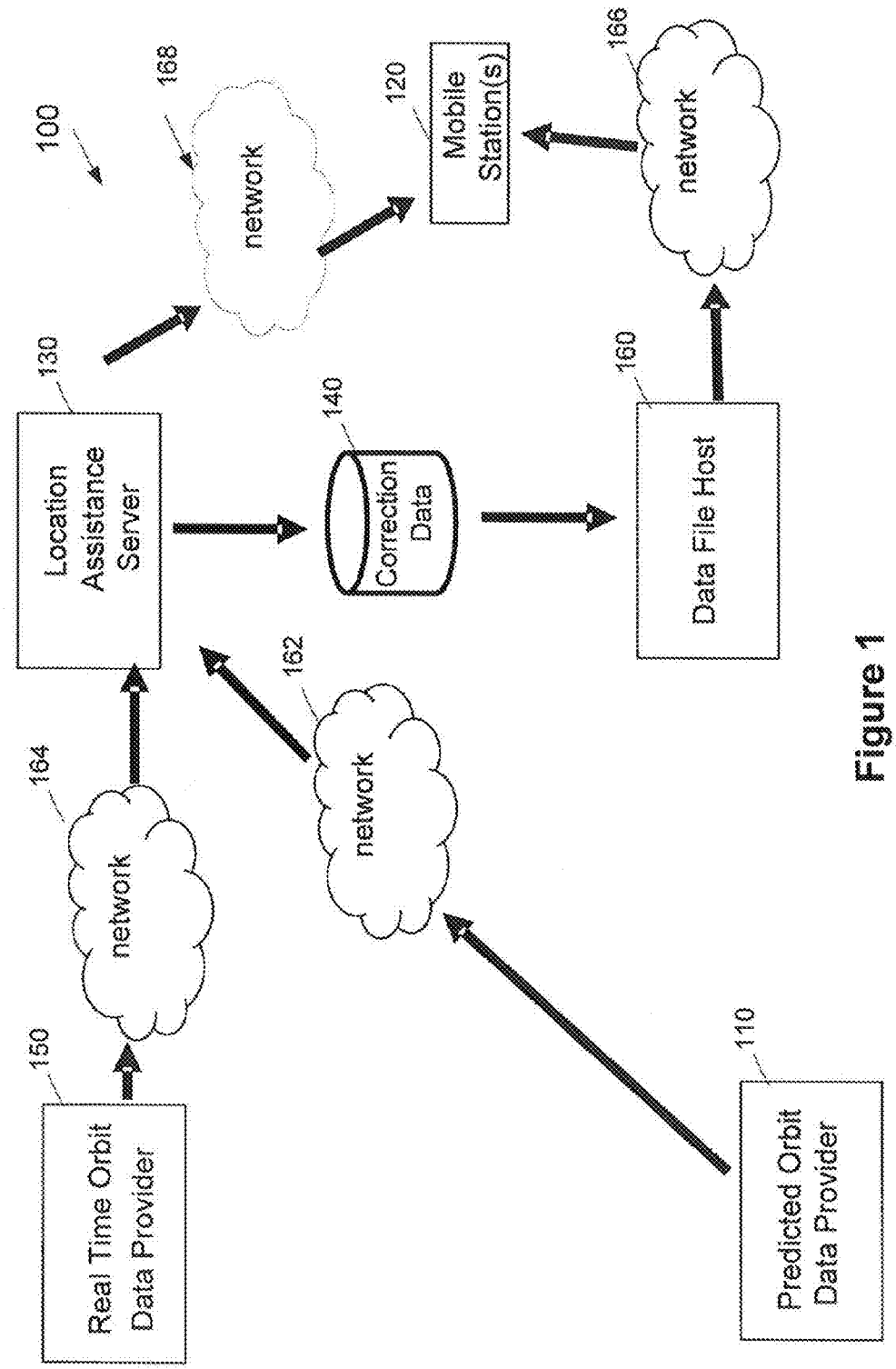
FIG. 1 is a diagram showing an example of a communication system including a server to assist a mobile station to locate a satellite.

A method and system for assisting a mobile station to determine its position (or velocity) and time (referred to as "a fix") is described. The method and system also improves the precision of satellite clock bias. Satellite clock bias, as described herein, refers to the difference of satellite clock's time estimate from a master clock, such as a Global Positioning System (GPS) master clock. From the positions and clock bias of multiple satellites, a mobile station can determine its own position and time. In one aspect of the invention, the position and clock bias of each satellite may be provided to the mobile station from a variety of sources with different degrees of precision. Generally, real-time orbit data (e.g., ephemeris) has the highest accuracy, but may not be available all the time. A "hybrid" technique is introduced herein to enable a mobile station to combine the real-time orbit data with other satellite orbit information, such as predicted orbit data, in the calculation of a position/velocity/time fix. The combination of satellite orbit data may involve multiple satellites and/or multiple satellite systems. The hybrid technique described herein also enables a mobile station to utilize real-time orbit data of a satellite to improve the precision of satellite clock bias in the predicted orbit data. The improved prediction data may be made for the same satellite, or a different satellite in the same or another satellite system.

As used herein, a mobile station (MS) refers to a device such as a cellular or other wireless communication device, personal communication system (PCS) device, personal navigation device, laptop or other suitable mobile device capable of receiving and processing SPS signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station."

The term "coarse orbit data" herein refers to a coarse and less accurate estimate of satellite position and clock data transmitted from a satellite, e.g., almanac. The term "real-time orbit data" refers to a precise representation of satellite positions, velocity and timing transmitted from a satellite, e.g., ephemeris including subframes 1, 2 and 3. A mobile station may, at a predetermined time interval, acquire a block of real-time orbit data that is valid for a time period. Thus, "valid real-time orbit data" refers to the real-time orbit data that is acquired recently and is within its period of validity. "Invalid real-time orbit data" refers to the real-time orbit data that is too old and is no longer valid. Unless specifically indicated to the contrary, the term "real-time orbit data" refers to "valid real-time orbit data" in the following description. The term "predicted orbit data" refers to a precise estimate of satellite position, velocity and timing that has a relatively extended period of validity compared to the real-time precise orbital data. The predicted orbit data is available at a location assistance server, and can be transmitted to or stored at a location accessible by a mobile station.

To increase the efficiency of data transfer, a location assistance server may transfer correction data to a mobile station, and the mobile station may reconstruct the predicted orbit data, or an approximation thereof, by combining the correction data with the coarse orbit data. In the descriptions that follow, it is understood that "predicted orbit data" used by a mobile station includes the predicted orbit data, or an approximation of the predicted orbit data that is reconstructed by the mobile station from the coarse orbit data.

FIG. 1 is a block diagram of a communication system 100 according to an aspect of the present invention. System 100 includes a location assistance server 130 communicatively coupled to one or more MS(s) 120. Location assistance server 130 receives coarse orbit data, as well as predicted orbit data and/or predicted orbital parameter files containing predicted orbit data. In one scenario, location assistance server 130 receives predicted orbit data via a network 162 from a predicted orbit data provider 110. Network 162 may comprise, but is not limited to, a network that supports Internet Protocol (IP) connections (e.g., the Internet). Location assistance server 130 may optionally include an interface, e.g., secure file transfer program (SFTP), for securely transferring the predicted orbit data from predicted orbit data provider 110.

In one aspect, predicted orbit data provider 110 generates predicted orbit data periodically (e.g. every few hours) to produce orbital data which is valid for an extended duration in time (e.g., 6 hours or more). Location assistance server 130 checks for new data from the predicted orbit data provider periodically. Predicted orbit data may also include 3-D uncertainty values for predicted satellite coordinates, uncertainty of predicted satellite clock corrections, as well as an indication of predicted outages. Based on the uncertainty and outage information, a User Range Error (URE) may be computed by location assistance server 130 and provided to MS 120.

Location assistance server 130 receives coarse orbit data from a real-time orbit data provider 150 via a network 164. Real-time orbit data provider 150 may be a Global Reference Network (GRN) gateway or a Wide Area Reference Network (WARN) gateway that receives real-time satellite information including, but not limited to, packet-based SPS reference data, navigation messages, health page information, almanac, and ephemeris. In one scenario, network 164 is a network that supports IP connections, and location assistance server 130 may receive the real-time satellite information from real-time orbit data provider 150 in IP multicast messages.

Location assistance server 130 generates correction data 140 from the predicted orbit data and the real time coarse orbit data. Correction data 140 may be transmitted directly to MS 120 via network 168 or to a storage location accessible by the MS. For example, correction data 140 may be stored in a storage device locally or remotely coupled to location assistance server 130. MS 120 may receive correction data 140 from data host 160 via a network 166 using a file transfer protocol, e.g., FTP, HTTP, or other suitable network protocols. MS 120 may receive these correction data (with or without the coarse data information) in a point-to-point manner via network 168, directly from location assistance server 130.

For the purpose of simplifying the discussion herein, the term "correction data" 140 refers to satellite orbital corrections that can be transmitted point-to-point, transferred in files, broadcast, or sent from one place to another by any means of data communications. The messages generated by location assistance server 130 have an efficient messaging format that allows MS 120 to determine the satellite positions, velocity and clock timing with a small number of bits over an extended time period. The messages provide MS 120 the information for correcting coarse orbit data so that the corrected satellite position is accurate to within a few meters.

The location assistance server 130 may also provide coarse orbit parameters, estimated accuracy (User Range Error (URE)), ionospheric correction model, universal coordinated time (UTC) model, and satellite health/usability information to MS 120. This is to ensure the integrity of the satellite data, and to allow mobile operation without the need to receive and decode the data transmitted by the satellites over the air. This also ensures that MS 120 uses the coarse orbit data which is identical to that used by location assistance server 130.

It should be noted that the system described above is shown for illustration purposes only and other configurations may exist. For example, networks 162, 164, 166, and 168 may alternatively be point-to-point connections, local area networks, wide area networks, broadcast networks, any suitable wired or wireless networks, computers or computer networks or combinations thereof that support data communication or file transfers.

One skilled in the art will see that the coarse orbit data which provides a coarse estimate of the satellite positions encompasses a broad range of forms. In the following description, a recent copy of the GPS broadcast almanac is suggested for use as the coarse estimate of the satellite positions and clock timing for ease in understanding the inventive concept. However, all of the following are illustrative of alternative coarse orbit data: an earlier copy of GPS broadcast ephemeris; recent copies of broadcast Galileo or GLONASS almanac or ephemeris; a non-broadcast coarse model of satellite positions which follows the same form as GPS, Galileo, or GLONASS almanac or ephemeris; any subset or enhancement of the Keplerian parameters used in GPS, Galileo, and GLONASS almanac and ephemeris formats; any non-Keplerian representations of satellite orbits; and other predicted orbit data which has degraded over time. It will also be understood that corresponding information pertaining to other satellite navigation systems can also be applied within the scope of the disclosed methodology. The present invention includes any and all methods of describing a coarse orbit. One skilled in the art will appreciate that the methodology applies no matter what form that coarse estimate takes.

In some scenarios, the coarse orbit data may be supplied by location assistance server 130 to MS 120. In addition to transmitting the coarse estimate of the satellite positions to MS 120, location assistance server 130 has the ability to include a reference time in the assistance message to the mobile station. In this aspect of the invention, location assistance server 130 obtains the reference time from a network time server, or from GPS data received from individual reference receivers (e.g., Wide Area Reference Network or Global Reference Network). This reference time information can be appended to the message that is transmitted to MS 120 which contains the coarse estimate of satellite positions. Location assistance server 130 may also implement algorithms which can improve the timing accuracy of the reference time provided by the network time server and transmit this more accurate time to MS 120.

It is to be noted that MS 120 can directly obtain the reference time, independent of location assistance server 130, from a packet switched data network that may or may not be synchronized to GPS time (e.g., a network time server or a CDMA communication network). In this manner, MS 120 obtains an estimate of a global time reference, for example, GPS time, Universal Coordinated Time (UTC) time, (WWO) time, etc.

FIG. 2A shows an example of an environment in which MS 120 may operate to determine its spatial and timing information. MS 120 uses a combination of orbit data to determine its position (or velocity) in three spatial dimensions and in the time dimension. MS 120 uses real-time orbit data decoded from satellites whenever the real-time orbit data is available. The real-time data may have been decoded from broadcast satellite messages, but also may have come from a satellite reference network via a location assistance server when network connection is available or was available recently. Real-time orbit data is generally more accurate than the earlier predicted orbit data, which may gradually degrade over a period of time. Also, real-time orbit data may contain new information about the satellites not known at the time of predictions (e.g. satellite health and integrity information).

For simplicity of the following description, the term "unavailable/unavailability of real-time orbit data" herein refers to a situation where the real-time orbit data cannot be received by MS 120, another situation where the earlier received real-time orbit data by MS 120 becomes invalid (e.g., beyond ±2 hours from TOE), or a combination of both, unless specifically indicated otherwise. The term "available/availability" refer to a situation where the real-time orbit data received by and stored in MS 120 is within its period of validity.

Although it is generally more desirable to use real-time orbit data in the calculation of a fix, MS 120 sometimes does not have access to valid real-time orbit data of a satellite. This situation may occur when fresh real-time orbit data for the satellite is unavailable, and when real-time orbit data (for the satellite) received earlier by MS 120 has become invalid. Fresh real-time orbit data for the satellite may be unavailable due to lack of line of sight, shadowing, or other reception problems that prevent MS 120 from receiving satellite broadcasts from the satellite and when the connection to location assistance server 130 is not available or desirable (e.g., in view of data transmission cost). Real-time orbit data received earlier by MS 120 may become invalid when the data obtained by MS 120 in an earlier time period becomes too old to be useful (e.g., beyond +/−2 hours from time of applicability). When MS 120 does not have access to valid real-time orbit data from sufficient number of satellites to compute its own location, MS 120 may use a combination of orbit data, such as real-time orbit data combined with predicted orbit data, to determine its spatial and timing information.

Referring to the example of FIG. 2A, MS 120 has predicted orbit data for a plurality of satellites, e.g., satellites 21, 22, 23, 24 and 25, and, additionally, receives real-time orbit data (indicated by solid lines) of some of the satellites e.g., 21 and 22. Real-time orbit data of satellites 23, 24 and 25 are unavailable (indicated by dotted lines) at the time when MS 120 determines a fix. MS 120 may combine the real-time orbit data of satellites 21 and 22 with the predicted orbit data of any two of the other satellites (i.e., 23, 24 and 25) in the determination of its three-dimensional spatial location and time. That is, if the number of satellites providing real-time orbit data is not sufficient for MS 120 to determine a fix (e.g., two in-view satellites for four unknowns in the fix as shown in FIG. 2A), MS 120 can combine the real-time orbit data provided by these satellites with predicted orbit data from other satellites to determine a fix.

In the example of FIG. 2A, MS 120 utilizes the orbit data from four satellites to determine its position (or velocity) in three spatial dimensions and time. However, if MS 120 knows any of its spatial parameters or time, the number of satellites necessary for MS 120 to determine a fix is reduced. Illustratively, if MS 120 knows its altitude, the number of unknowns in a fix is reduced to three. Similarly, if available, time may be obtained from a communications network or can be maintained by a highly accurate oscillator. As a result, the number of satellites necessary for MS 120 to determine a fix can be reduced.

Figure 2B:
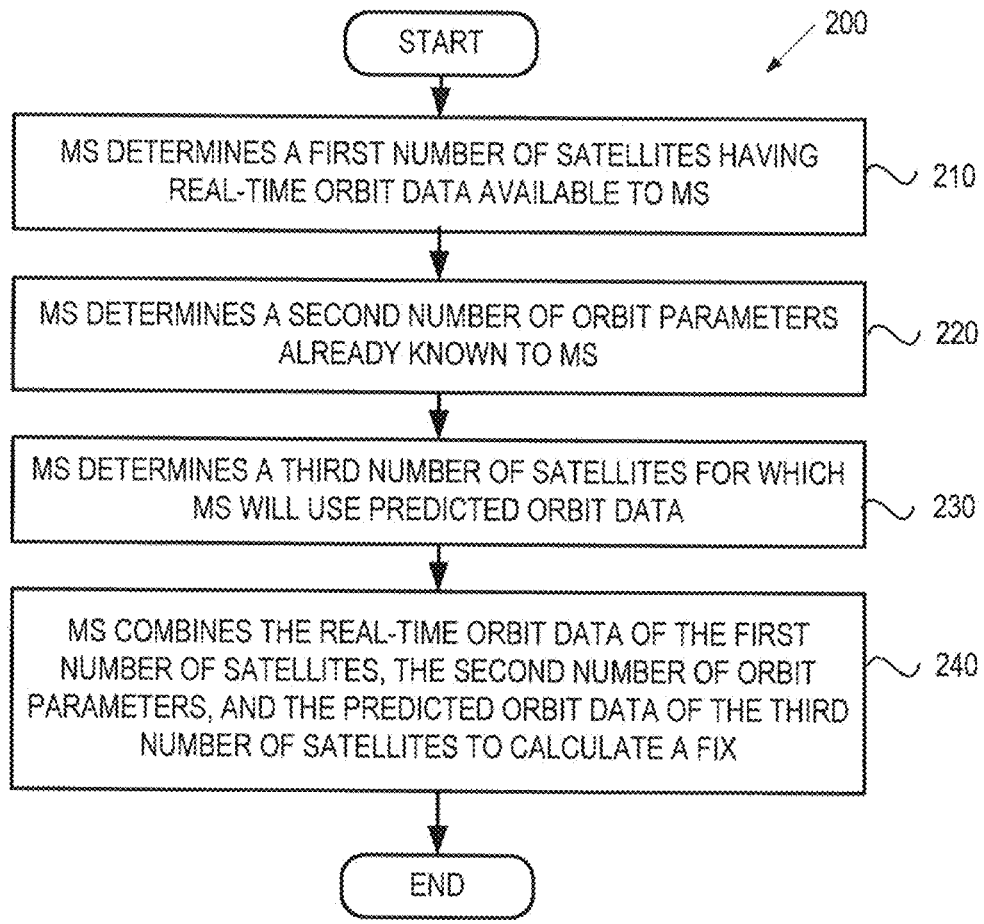
FIG. 2B is a flow diagram that illustrates an example of a process of the MS for combining real-time orbit data and predicted orbit data of different satellites.

FIG. 2B is a flow diagram that illustrates an example of a process 200 for performing the operations described above. At block 210, MS 120 determines a first number of satellites having real-time orbit data available to the MS. To determine the first number, MS 120 needs to monitor the validity of the real-time orbit data that it received earlier. MS 120 may use a timer to keep track of the current time with respect to the time of applicability of the real-time orbit data. MS 120 may also reset the timer when a fresh set of real-time orbit data for a satellite is received, and expire the timer after a predetermined period of time. At block 220, MS 120 determines a second number of orbit parameters (including three spatial dimensions and time) that it knows or can be obtained from other means. At block 230, MS 120 determines a third number of satellites for which it will use predicted orbit data. The third number can be determined, for example, by subtracting the sum of the first number and the second number from four. At block 240, MS 120 combines the real-time orbit data of the first number of satellites, the second number of known orbit parameters, and the predicted orbit data of the third number of satellites to calculate a fix.

Referring again to FIG. 2A, in one scenario, MS 120 may use the real-time orbit data of satellites 21 and 22 and the predicted orbit data of satellites 23, 24 and 25 to determine the four unknowns in a fix. The five sets of orbit data from the five satellites constitute an over-determined system. MS 120 may appropriately weigh the satellite measurements from the five satellites in the solution for its position/velocity/time and account for the degraded accuracy of predicted orbit data. The weights in the weighted combination may be determined according to the accuracy of each set of orbit data. For example, real-time orbit data and predicted orbit data may be weighed according to their accuracy estimates. The accuracy estimates may include User Range Error (URE), User Range Accuracy (URA), time to Time of Ephemeris (TOE), the age of the predicted data from last update, a combination of some or all of the above, or other metrics.

The accuracy estimate metrics are further explained below. The URE is typically computed or provided by location assistance server 130 as an uncertainty estimate for the predicted orbit data of a satellite. As MS 120 reconstructs the predicted orbit data from the coarse orbit data (with a correction), the URE can be used as an accuracy estimate for the predicted orbit data. Since the coarse orbit data is the same used by location assistance server 130 and MS 120, the errors associated with coarse orbit do no contribute to overall error budget. The URA is an uncertainty estimate of the real-time orbit data of a satellite, which is provided, for example, by a GPS control segment. The URA is usually a couple of meters, and the URE may be tens of meters after a couple of days of predictions. Both error estimates can be used as weights in a weighted combination of predicted orbit data and real-time orbit data. Further, time to TOE indicates the age of the real-time orbit data, and can also be used as an accuracy estimate, as well as the weights in a weighted combination of predicted orbit data and real time orbit data. Similarly, the age of the predicted data from the last update indicates the accuracy of the predicted orbit data, and can also be used as an accuracy estimate, as well as the weights in a weighted combination of predicted orbit data and real time orbit data. Satellite measurements with smaller errors (e.g., real-time orbit data) can be weighed higher than measurements with larger errors (e.g., predicted orbit data or coarse orbit data). Fresher satellite measurements can be weighed higher than older satellite measurements.

Figure 3A:
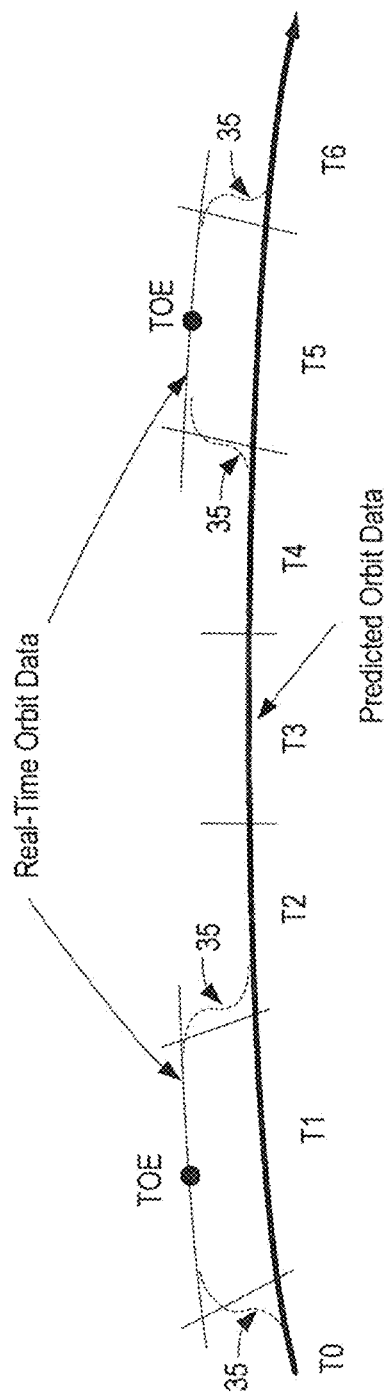
FIG. 3A is a diagram showing predicted orbit data in a time sequence, in which real-time orbit data is available in some of the time periods.

FIG. 3A is a diagram that illustrates a timeline of available orbit data for a satellite. Referring to the example of FIG. 3A, MS 120 has predicted orbit data of a satellite for time periods T0-T6. Real-time orbit data of the same satellite is available to MS 120 at time periods T1 and T5, both of which are centered at TOE. The real-time orbit data diverges from the actual orbit data, and becomes invalid as time progresses past the boundary of T1 and T5. In this example, MS 120 switches from the predicted orbit data to the real-time orbit data at the boundary of T0 and T1, and switches back to the predicted orbit data at the boundary of T1 and T2. Similarly, MS 120 switches from the predicted orbit data to the real-time orbit data at the boundary of T4 and T5, and switches back to the predicted orbit data at the boundary of T4 and T5. In one aspect of the invention, MS 120 interpolates the predicted orbit data and the real-time orbit data at the boundary of T0 and T1, T1 and T2, T4 and T5, and T4 and T5, using, illustratively, interpolating curves 35. Interpolating curves 35 may be computed using any known interpolating techniques that smooth the transitions between two sets of data (e.g., the real-time orbit data and the predicted orbit data of a single satellite) to avoid a sudden change in the orbit data that is used by MS 120 in the determination of a fix.

Figure 3B:
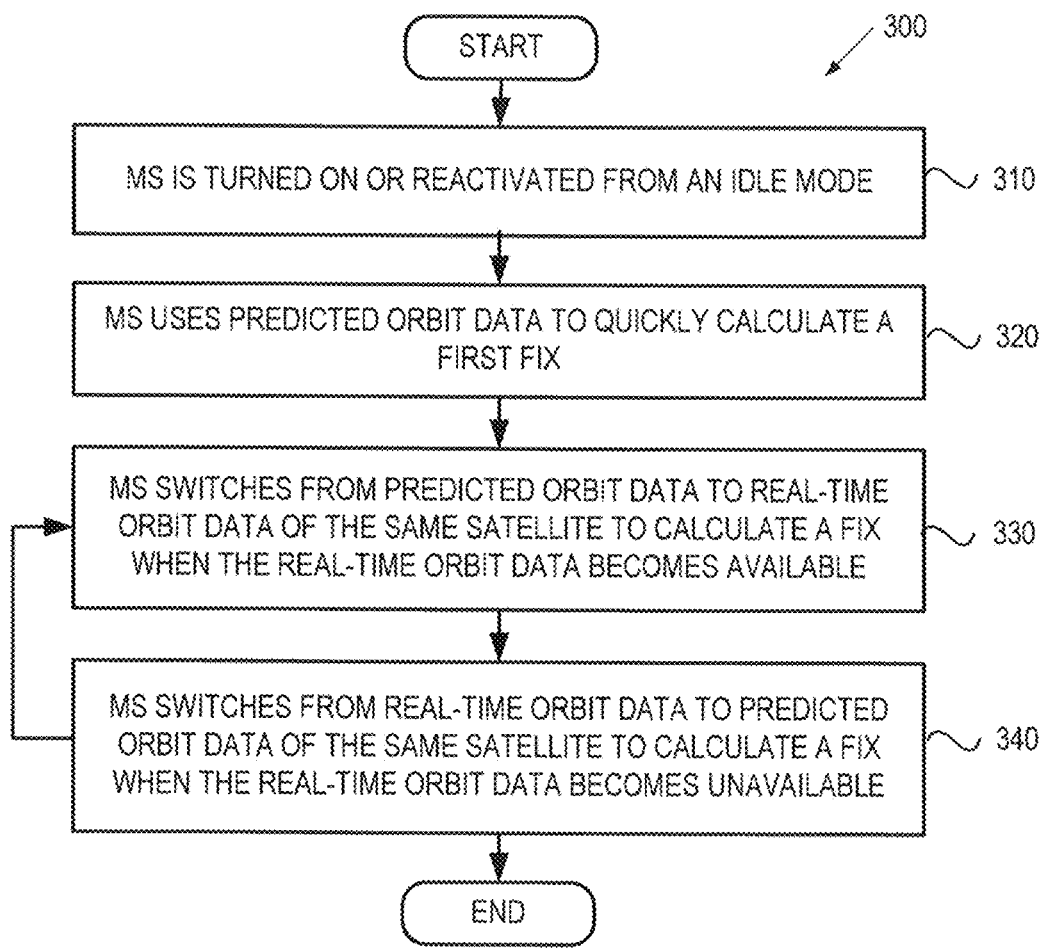
FIG. 3B is a flow diagram that illustrates a process of the MS for using real-time orbit data of a satellite in a first time period and predicted orbit data of the same satellite in a second time period.

FIG. 3B is a flow diagram that illustrates a process 300 where MS 120 may combine the use of real-time orbit data and predicted orbit data, as described in FIG. 3A. In this scenario, MS 120 uses the real-time orbit data of a satellite in a first time period and predicted orbit data of the same satellite in a second time period. As mentioned above, each of the satellites 21-25 may have real-time orbit data available to MS 120 during a valid period of the real-time orbit data. When real-time orbit data becomes unavailable, MS 120 can switch to the predicted orbit data. When the real-time orbit data becomes available again, MS 120 can switch back to the real-time orbit data. Thus, MS 120 may use real-time orbit data of a satellite for one time period and predicted orbit data of the same satellite for another time period, depending on the availability or validity of the real-time orbit data. Referring to the example of FIG. 3B, at block 310, MS 120 is turned on or re-activated from an idle mode. At block 320, before MS 120 obtains access to valid real-time orbit data, MS 120 can use predicted orbit data to quickly calculate a first fix, and increased accuracy can be achieved once the real-time orbit data is demodulated and decoded. MS 120 may also weigh whether stored real-time orbit data from a previous fix and/or download is available and sufficiently fresh to use prior to the decision to use the predicted orbit data. In a scenario where only one fix is performed, the decision between accuracy and speed may be based on the desired quality of service.

Proceeding to block 330, when the real-time orbit data of any of the satellites that MS 120 uses to calculate a fix becomes available, MS 120 may switch from the predicted orbit data of the satellite to the available real-time orbit data. At block 340, when the real-time orbit data of any of the satellites that MS 120 uses to calculate a fix becomes unavailable, MS 120 may switch from the real-time orbit data of the satellite to its predicted orbit data. It is noted that, in one scenario, the operation of block 320 may be performed in parallel with the operations of blocks 330 and 340. The operations of blocks 330 and 340 may be repeated as real-time orbit data becomes available or unavailable. Thus, MS 120 may combine the real-time orbit data of some satellites with the predicted orbit data of some other satellites to determine a fix. The combination of the real-time orbit data and the predicted orbit data is dynamic. Any time when real-time orbit data of a satellite becomes available, MS 120 can dynamically determine a new combination of real-time orbit data and predicted orbit data for determination of a fix. The new combination includes the most number of satellites having real-time orbit data available at any given time, but does not necessarily wait for real time orbit data before performing the first fix.

Referring to FIG. 3A, MS 120 may interpolate the real-time orbit data and the predicted orbit data of the same satellite by using a weighted combination of the real-time orbit data and the predicted orbit data that overlap in time. The weighted combination can be applied to position, velocity, time, or any combination thereof MS 120 may appropriately weigh the orbit data in the solution for its position/velocity/time. For example, real-time orbit data and predicted orbit data may be weighed according to their accuracy estimates. The accuracy estimates may include User Range Error (URE), User Range Accuracy (URA), time to Time of Ephemeris (TOE), the age of the predicted data from the last update, a combination of some or all of the above, or other metrics.

The above accuracy estimate metrics have been explained in the description of FIG. 2A. In the single satellite scenario of FIG. 3A, the same accuracy estimate metrics also apply to the interpolation of real-time orbit data and the predicted orbit data, where the interpolation is computed as a weighted combination of the real-time orbit data and the predicted orbit data. Satellite measurements with smaller errors (e.g., real-time orbit data) can be weighed higher than measurements with larger errors (e.g., predicted orbit data or coarse orbit data). Fresher satellite measurements can be weighed higher than older satellite measurements.

In one scenario, the weighted combination ($Orbit_{combined}$) of predicted orbit data ($O_{predicted}$) and real-time orbit data ($O_{real-time}$) may be computed as:

$Orbit_{combined} = (W_1 \; O_{real-time} + W_2 \; O_{predicted})/(W_1 + W_2)$, where $W_1$ and $W_2$ are a function of (URE, URA), time to TOE, the age of the predicted data from the last update, a combination of some or all of the above, or other metrics.

In another aspect of the invention, real-time orbit data can be used to improve the accuracy of predicted orbit data. This "improved" predicted orbit data can be used in processes 200 and 300. That is, it can be used when real-time orbit data of the same satellite is unavailable, and/or can be used to combine with real-time orbit data of other satellites in the determination of a fix. The improvement in accuracy can be made to the entire predicted orbit data, including satellite positions in three spatial dimensions and satellite clock bias. Alternatively, the improvement in accuracy can be made to the satellite clock bias only, as the clock bias is generally not as predictable as the satellite trajectory and is more susceptible to degradation over time. The improvement in accuracy can be made to the same satellite providing the real-time orbit data or a different satellite.

Figure 4:
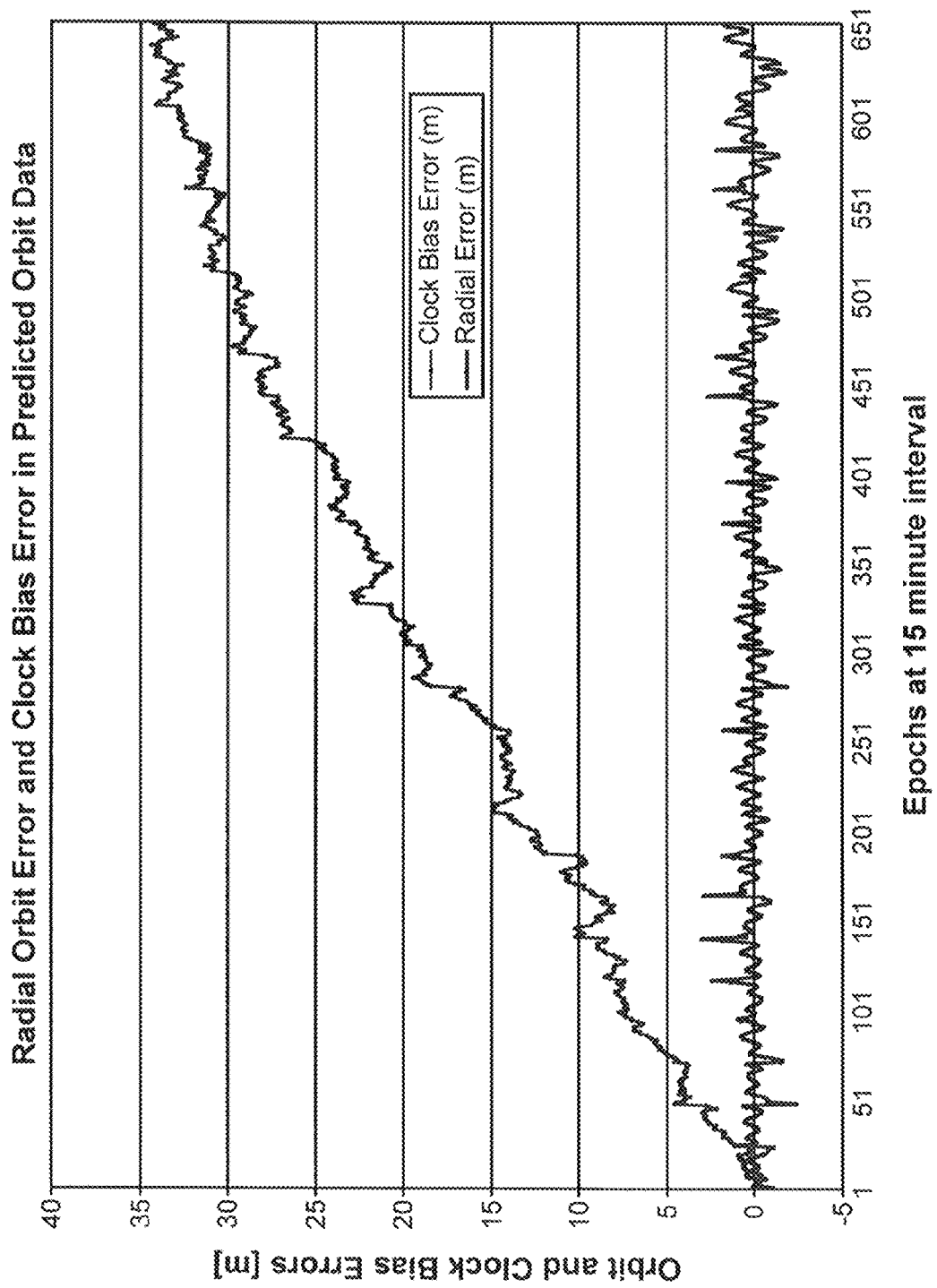
FIG. 4 is a chart showing an example of radial orbit errors and clock bias errors in predicted orbit data as a function of time.

FIG. 4A is a chart showing two error components in the predicted orbit data of a satellite. The first error component is the satellite orbit error in the radial direction (radial orbit error), and the second error component is the error of satellite clock bias (clock bias error). The radial orbit error is the difference between the predicted and the actual radial orbit positions, and the clock bias error is the difference between the predicted and the actual clock biases. The X-axis of the chart indicates the time, and the Y-axis indicates the magnitude of the errors in meters. The chart shows that the clock bias error increases significantly with time while the radial orbit error fluctuates around zero. Thus, the chart shows that the accuracy of clock bias in the predicted orbit data degrades quickly over time.

Clock bias in the predicted orbit data (the predicted clock bias) can be corrected with two approaches. One approach is to use the real-time orbit data of an earlier time period of a satellite to correct the predicted clock bias of the same satellite in a current or future time period. Another approach is use the real-time orbit data of other satellites to provide the correction for the satellite in the same time period. In the first approach, the more "fresh" (e.g., less deviation from the TOE) the real-time orbit data, the more accurate the correction is. To make the correction, the predicted clock bias can be compared with the real-time broadcast satellite clock parameters (e.g. from subframe 1 of GPS navigation) to determine the amount of correction to the predicted clock bias. The correction may include differential offset and slope. After the correction, MS 120 can use the predicted orbit data (including the predicted clock bias) to determine a fix when the real-time orbit data becomes unavailable.

To further explain the second approach, it is useful clarify that the second approach is used in an "over-determined" system. That is, the number of satellites with real-time orbit data (herein referred to as "the satellite group") is equal to or greater than the number of unknowns in a mobile fix. MS 120 can uniquely determine a fix using the number of satellites in the satellite group that equal the number of unknowns in the fix. The real-time orbit data available for satellite group and corresponding measured pseudoranges can be used to correct the predicted clock bias of one or more satellites outside the satellite group.

Illustratively, for a 2-dimensional position estimate (assuming that sufficiently accurate altitude knowledge is available at MS 120), MS 120 will need three in-view satellites to determine its unknown parameters including mobile position in two dimensions and time. The real-time orbit available for three in-view satellites and corresponding measured pseudoranges can be used to correct the predicted clock bias for additional in-view satellites (for example, a fourth in-view satellite with only predicted clock bias). For a 3-dimensional position estimate, MS 120 will need four in-view satellites to determine its unknown parameters including mobile position in three dimensions and time. The real-time orbit data available for the four in-view satellites and corresponding measured pseudoranges can be used to correct the predicted clock bias for a fifth in-view satellite. If predicted clock bias from a sixth satellite and a seventh satellite are also available to MS 120, the real-time orbit data provided by the four in-view satellites and corresponding measured pseudoranges can be used to correct the predicted clock bias for the additional (e.g. sixth and the seventh, etc) satellites. The correction to the predicted clock bias can be computed by a Weighted Least Squares model (WLS), a Kalman filter, or some other linear, linearized, or non-linear estimation methods. These corrections may be run in background during GPS operation, even when complete GPS constellation is visible, refreshing the predicted data for best accuracy and performance when satellite visibility is lost, and when the ephemeris has degraded to the extent to make it more accurate to use predicted or hybrid predicted data.

The hybrid techniques described herein can be applied to a combination of satellite positioning systems (SPS) or global navigation satellite system (GNSS), such as, but not limited to, the United States Global Positioning System (GPS), the Russian Glonass system, the European Galileo system, the Japanese QZSS system, any system that uses satellites from a combination of satellite systems, or any satellite system developed in the future. That is, MS 120 may use predicted orbit data from one satellite system (e.g., the GPS) and real-time orbit data from one or more other satellite systems (e.g., the Galileo and Glonass systems) to determine a fix. MS 120 may also use real-time clock biases of satellites of one satellite system to correct predicted clock bias of a satellite (or satellites) of another satellite system if pseudoranges are available for these satellites, and if there is more observables than unknowns in the system. For example, the real-time clock bias of a satellite in the Galileo system can be used to correct predicted clock bias of a satellite in the Glonass system. For the proper application of this algorithm, the overall clock bias between master clocks of two satellite positioning systems (e.g. GPS vs Galileo) must be known by MS 120.

Figure 5:
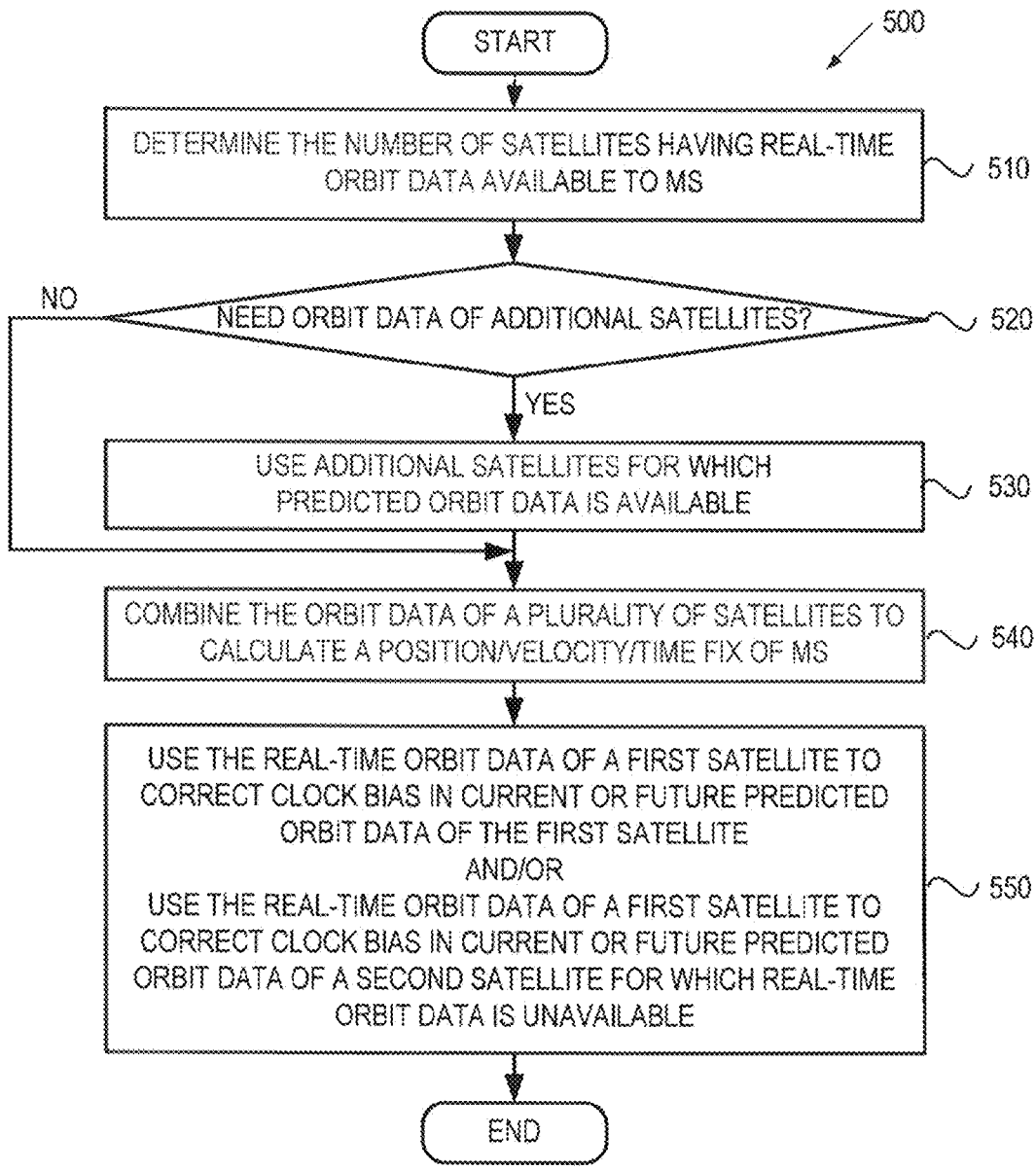
FIG. 5 is a flowchart showing a process of the MS for correcting predicted orbit data using real-time orbit data.

FIG. 5B illustrates a flow diagram of one example of a process 500 for determination of a position/velocity/time fix at a mobile station. Process 500 may be performed by hardware (e.g., circuitry, dedicated logic, programmable logic, microcode, etc.), software (such as instructions run on a processing device), or a combination thereof Process 500 may be performed by MS 120 of FIG. 1.

Referring to FIG. 5B, at block 510, process 500 begins with MS 120 determining the number of satellites that have real-time orbit data available at MS 120. As mentioned above, the number of satellites necessary for a fix depends on the number of unknowns at MS 120. For example, if none of the three spatial dimensions and time of MS 120 are known, MS 120 will need orbit data from four satellites. In this scenario, MS 120 ideally would receive the real-time orbit data from four satellites. However, if less than four satellites provide real-time orbit data to MS 120, MS 120 will resort to one or more other satellites for which predicted orbit data is available. As mentioned above, the number of satellites having real-time orbit data may differ from one time period to the next due to shadowing, reception problems, and other reasons.

Proceeding to block 520, based on the number of unknowns of MS 120, process 500 determines whether orbit data of more satellites is needed. If the orbit data of one or more additional satellites is needed, at block 530, MS 120 uses predicted orbit data of the one or more additional satellites in the determination of a fix. If MS 120 receives real-time orbit data from sufficient satellites or from location assistance server 130 in a prior AGPS session (i.e., the number of satellites equals the number of unknowns), no predicted orbit data is necessary. Proceeding to block 540, MS 120 combines the orbit data from the satellites to compute a position/velocity/time fix. In one aspect of the invention, at block 550, MS 120 also uses the available real-time orbit data of a first satellite to correct the satellite clock bias in the current or future predicted clock bias of the first satellite, and/or uses the available real-time orbit data of a first satellite to correct the satellite clock bias in the current or future predicted orbit data of a second satellite for which real-time orbit data is unavailable. The second satellite may be in the same or a different satellite system as the first satellite, as described above.

Figure 6:
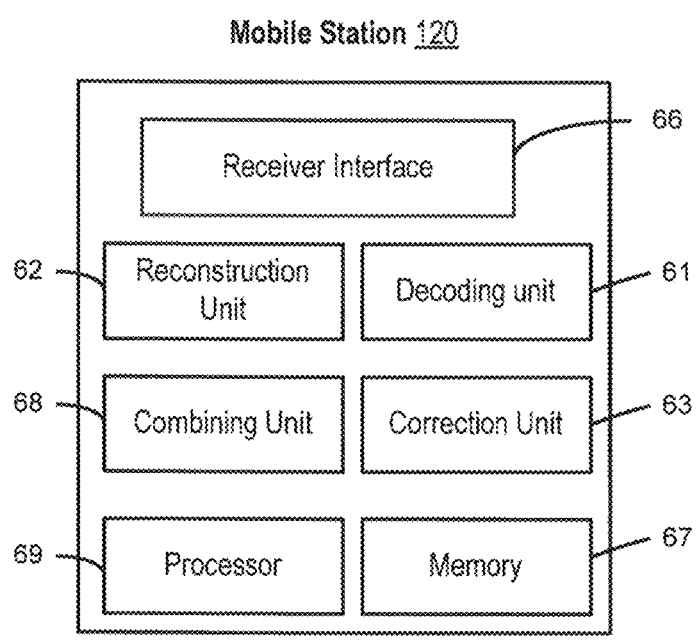
FIG. 6 is a block diagram showing an example of components in the mobile station of FIG. 1.

FIG. 6 provides an example of a block diagram of components of MS 120. MS 120 includes a memory 67 and a processor 69. MS 120 also includes a receiver interface 66 for receiving the coefficient sequences from location assistance server 130. Receiver interface 66 also receives coarse orbit data and/or real-time orbit data, e.g., almanac, ephemeris, and/or other satellite position and timing information, from satellite broadcasts, from location assistance server 130, or from other data sources. Receiver interface 66 may receive the coefficients via wired or wireless networks, broadcast medium, or any suitable data transmission means. MS 120 includes a decoding unit 61 to decode the data sequences sent from location assistance server 130. In one scenario, MS 120 may also include a reconstruction unit 62, a combination unit 68 and a correction unit 63. Reconstruction unit 62 reconstructs predicted orbit data using a data sequence transmitted from location assistance server 130, such as coarse orbit data and correction data. Combination unit 68 determines whether the real-time orbit data of a satellite received and stored at MS 120 is still valid by keeping a timer that monitors the current time with respect to the time of applicability of the real-time orbit data. Depending on the availability and validity of the real-time orbit data, the combination unit 68 combines the real-time orbit data of some satellites and the predicted orbit data of some other satellites to determine a fix. Correction unit 63 uses the available real-time data to correct the satellite clock bias in the predicted data, as describe above. As mentioned above, the correction of the clock bias can be made to the same satellite for which real-time orbit data is available, or another satellite of the same or a different satellite system.

The methodologies described herein may be implemented by various means depending upon the application. For example, the above components of location assistance server 130 and MS 120 may be implemented in hardware, firmware, software, or a combination thereof For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, referring back to FIG. 6, software codes may be stored in a memory (e.g., memory 67 of MS 120) and executed by a processor (e.g., processor 69 of MS 120). Memory may be implemented within the processor or external to the processor. As used herein the term "memory" refers to any type of long-term, short-term, volatile, nonvolatile, or other memory and is not to be limited to any particular type of memory or number of memories, or type of media upon which memory is stored.

The method and apparatus described herein may be used with various satellite positioning systems (SPS) or global navigation satellite system (GNSS), such as, but not limited to, the United States Global Positioning System (GPS), the Russian Glonass system, the European Galileo system, any system that uses satellites from a combination of satellite systems, or any satellite system developed in the future. Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals," as used herein, is intended to include SPS-like signals from pseudolites or equivalents of pseudolites.

Position determination techniques described herein may be used for various wireless communication networks, such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as CDMA2000, Wideband-CDMA (W-CDMA), and other current and next-generation networks. CDMA2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

Although the present invention has been described with reference to specific exemplary features, it will be evident that various modifications and changes may be made to these features without departing from the broader spirit and scope of the invention as set forth in the claims. Accordingly, the specification and drawings are to be regarded in an illustrative rather than restrictive sense.

What is claimed is:

1. A system implemented in a mobile station, the system comprising:
a receiver interface configured to receive real-time orbit data of a first satellite;
a correction unit configured to identify at least one real-time clock parameter within the real-time orbit data and to correct an error of a clock bias in predicted orbit data of one or more additional satellites using the at least one real-time clock parameter within the real-time orbit data of the first satellite; and
a combining unit configured to combine the real-time orbit data of the first satellite with predicted orbit data, comprising corrected clock bias data that was corrected using the at least one real time clock parameter within the real-time orbit data of the first satellite, of a second satellite in determination of spatial and time information of the mobile station, wherein the first satellite and the second satellite belong to two different satellite systems, and wherein the predicted orbit data has an extended period of validity compared to the real-time orbit data and comprises at least one of 3-D uncertainty values for predicted satellite coordinates or uncertainty values of predicted satellite clock corrections.

2. The system of claim 1, wherein:
the receiver interface is further configured to:
receive predicted orbit data from each of a plurality of satellites; and
receive real-time orbit data from each of the plurality of satellites; and
the combining unit is further configured to determine whether the mobile station has received predicted orbit data and real-time orbit data from each of the plurality of satellites sufficient to constitute an over-determined system for determining a position fix of the mobile station.

3. The system of claim 2, wherein if it is determined there is an over-determined system, the combining unit is further configured to:
assign weighing components to each of the predicted orbit data and the real-time orbit data from each of the plurality of satellites, the weighing components based according to an accuracy criteria for each of the predicted orbit data and the real-time orbit data; and determine the position fix of the mobile station by combining the predicted orbit data and the real-time orbit data from each of the plurality of satellites in a combination according to the weighing components assigned.

4. The system of claim 3, wherein the combining unit is further configured to:
weigh predicted orbit data and real-time orbit data that have smaller errors more heavily than predicted orbit data and real-time orbit data that have larger errors;
weigh predicted orbit data and real-time orbit data that are more recent more heavily than predicted orbit data and real-time orbit data that are less recent;
weigh predicted orbit data and real-time orbit data that have a higher User Range Accuracy (URA) more heavily than predicted orbit data and real-time orbit data that have a lower URA; and
weigh predicted orbit data and real-time orbit data that have a lower User Range Error (URE) more heavily than predicted orbit data and real-time orbit data that have a higher URE.

5. The system of claim 1, wherein the combining unit configured to combine the real-time orbit data of the first satellite with the predicted orbit data of the second satellite is configured to:
use a weighted combination to combine the real-time orbit data of the first satellite with the predicted orbit data of the second satellite according to:

$$\text{Orbit}_{combined} = (W_1 \times O_{real-time} + W_2 \times O_{predicted})/(W_1 + W_2),$$

where $O_{real-time}$ is the real-time orbit data for the first satellite, $O_{predicted}$ is the predicted orbit data for the second data, and $W_1$ and $W_2$ are weight values derived as functions of User Range Accuracy (URA), User Range Error (URE), time to Time of Ephemeris (TOE), and an age of the predicted orbit data since a last update.

6. The system of claim 1, wherein the correction unit configured to correct the error of the clock bias in the predicted orbit data of the one or more additional satellites is configured to:
correct the error of the clock bias data in the predicted orbit data of the second satellite using the real-time orbit data for the first satellite with real-time data from one or more additional satellites within a first satellite system including the first satellite, with a number of satellites within the first satellite system providing the real-time data to the mobile station being sufficient to determine a position fix for the mobile station.

7. A system implemented by a mobile station, the system comprising:
a receiver interface configured to receive real-time orbit data from a plurality of first satellites for a determination of spatial and time information of the mobile station;
a correction unit configured to identify at least one real-time clock parameter within the real-time orbit data and to correct an error of a clock bias in predicted orbit data of one or more second satellites using the at least one real-time clock parameter within the real-time orbit data of the plurality of first satellites, wherein each of the plurality of first satellites are different from each of the one or more second satellites; and
a combining unit configured to combine the real-time orbit data from the plurality of first satellites with the predicted orbit data, comprising corrected clock bias data that was corrected using the at least one real time clock parameter within the real-time orbit data of the plurality of first satellites, of the one or more second satellites in determination of spatial and time information of the mobile station;
wherein a number of satellites in the plurality of first satellites is equal to or greater than a number of unknowns in the spatial and time information of the mobile station.

8. The system of claim 7, wherein respective ones of the plurality of first satellites belong to different satellite systems.

9. The system of claim 7, wherein each of the plurality of first satellites belong to a first satellite system and the one or more second satellites belong to one or more other satellite systems.

10. The system of claim 7, wherein the correction unit is further configured to use the real-time orbit data of a first one of the plurality of first satellites to correct the error of the clock bias in predicted orbit data of a first one of the plurality of first satellites.

11. A mobile station, comprising:
means for receiving real-time orbit data of a first satellite;
means for identifying at least one real-time clock parameter within the real-time orbit data;
means for correcting an error of a clock bias in predicted orbit data of one or more additional satellites using the at least one real-time clock parameter within the real-time orbit data of the first satellite; and
means for combining the real-time orbit data of the first satellite and predicted orbit data, comprising corrected clock bias data that was corrected using the at least one real time clock parameter within the real-time orbit data of the first satellite, of a second satellite in determination of spatial and time information of the mobile station, wherein the first satellite and the second satellite belong to two different satellite systems, and wherein the predicted orbit data has an extended period of validity compared to the real-time orbit data and comprises at least one of 3-D uncertainty values for predicted satellite coordinates or uncertainty values of predicted satellite clock corrections.

12. A computer program product for enabling a computer to determine spatial and time information, the computer program product comprising:
software instructions for enabling the computer to perform predetermined operations comprising generating spatial and time information of a mobile station; and
a non-transitory computer readable storage medium bearing the software instructions;
the predetermined operations further comprising:
receiving information indicative of real-time orbit data of a first satellite from a first satellite system;
identifying at least one real-time clock parameter within the real-time orbit data of the first satellite;
correcting an error of a clock bias in predicted orbit data of one or more additional satellites using the at least one real-time clock parameter within the real-time orbit data of the first satellite; and
receiving information indicative of a combination of the real-time orbit data of the first satellite and predicted orbit data, comprising corrected clock bias data that was corrected using the at least one real time clock parameter within the real-time orbit data of the first satellite, of a second satellite from a second satellite system, wherein the second satellite system is different from the first satellite system, and wherein the predicted orbit data has an extended period of validity compared to the real-time orbit data and comprises at least one of 3-D uncertainty values for predicted satellite coordinates or uncertainty values of predicted satellite clock corrections.

13. A method comprising:

receiving at a mobile station real-time orbit data of a first satellite;

identifying at the mobile station at least one real-time clock parameter within the real-time orbit data;

correcting at the mobile station an error of a clock bias in predicted orbit data of one or more additional satellites using the at least one real-time clock parameter within the real-time orbit data of the first satellite; and combining at the mobile station the real-time orbit data of the first satellite and predicted orbit data, comprising corrected clock bias data that was corrected using the at least one real time clock parameter within the real-time orbit data of the first satellite, of a second satellite in determination of spatial and time information of the mobile station, wherein the first satellite and the second satellite belong to two different satellite systems, and wherein the predicted orbit data has an extended period of validity compared to the real-time orbit data and comprises at least one of 3-D uncertainty values for predicted satellite coordinates or uncertainty values of predicted satellite clock corrections.

14. The method of claim 13, wherein combining the real-time orbit data of the first satellite with the predicted orbit data of the second satellite comprises:

using a weighted combination to combine the real-time orbit data of the first satellite with the predicted orbit data of the second satellite according to:

$$\text{Orbit}_{combined} = (W_1 \times O_{real\text{-}time} + W_2 \times O_{predicted})/(W_1 + W_2),$$

where $O_{real\text{-}time}$ is the real-time orbit data for the first satellite, $O_{predicted}$ is the predicted orbit data for the second data, and $W_1$ and $W_2$ are weight values derived as functions of User Range Accuracy (URA), User Range Error (URE), time to Time of Ephemeris (TOE), and an age of the predicted orbit data since a last update.

15. The method of claim 13, wherein correcting the error of the clock bias in the predicted orbit data of the one or more additional satellites comprises:

correcting the error of the clock bias data in the predicted orbit data of the second satellite using the real-time orbit data for the first satellite with real-time data from one or more additional satellites within a first satellite system including the first satellite, with a number of satellites within the first satellite system providing the real-time data to the mobile station being sufficient to determine a position fix for the mobile station.

\* \* \* \* \*